(12) United States Patent
Mathewson et al.

(10) Patent No.: US 11,269,773 B2
(45) Date of Patent: Mar. 8, 2022

(54) EXCLUSIVITY IN CIRCUITRY HAVING A HOME NODE PROVIDING COHERENCY CONTROL

(71) Applicant: Arm Limited, Cambridge (GB)

(72) Inventors: Bruce James Mathewson, Papworth Everard (GB); Phanindra Kumar Mannava, Austin, TX (US); Jamshed Jalal, Austin, TX (US); Klas Magnus Bruce, Austin, TX (US); Andrew John Turner, Cambridge (GB)

(73) Assignee: Arm Limited, Cambridge (GB)

( * ) Notice: Subject to any disclaimer, the term of this patent is extended or adjusted under 35 U.S.C. 154(b) by 225 days.

(21) Appl. No.: 16/595,863

(22) Filed: Oct. 8, 2019

(65) Prior Publication Data

US 2021/0103524 A1 Apr. 8, 2021

(51) Int. Cl.
| | |
|---|---|
| *G06F 9/52* | (2006.01) |
| *G06F 9/30* | (2018.01) |
| *G06F 15/78* | (2006.01) |
| *G06F 13/42* | (2006.01) |
| *G06F 13/16* | (2006.01) |
| *G06F 12/0831* | (2016.01) |
| *G06F 12/0817* | (2016.01) |
| *G06F 12/0815* | (2016.01) |

(52) U.S. Cl.
CPC .......... *G06F 12/0815* (2013.01); *G06F 9/526* (2013.01); *G06F 2212/1032* (2013.01)

(58) Field of Classification Search
CPC ................. G06F 12/0815; G06F 9/526; G06F 2212/1032; G06F 12/0833; G06F 12/0817; G06F 2212/1016; G06F 15/7807; G06F 15/7825; G06F 13/4282; G06F 9/3004; G06F 13/1663
See application file for complete search history.

(56) References Cited

U.S. PATENT DOCUMENTS

| 6,877,030 B2 * | 4/2005 | Deneroff | G06F 12/0813 |
| | | | 707/999.01 |
| 10,157,133 B2 * | 12/2018 | Jalal | G06F 12/0833 |
| 10,310,979 B2 * | 6/2019 | Jalal | G06F 12/0815 |

(Continued)

OTHER PUBLICATIONS

Combined Search and Examination Report for GB Application No. 2013941.6 dated Jan. 21, 2021, 9 pages.

*Primary Examiner* — Christopher D Birkhimer
(74) *Attorney, Agent, or Firm* — Nixon & Vanderhye P.C.

(57) ABSTRACT

Circuitry comprises a set of two or more data handling nodes each having respective storage circuitry to hold data; and a home node to serialise data access operations and to control coherency amongst data held by the one or more data handling nodes so that data written to a memory address is consistent with data read from that memory address in response to a subsequent access request; in which: a requesting node of the set of data handling nodes is configured to communicate a request to the home node for exclusive access to a given instance of data at a given memory address; and the home node is configured, in response to the request, to communicate information to other data handling nodes of the set of data handling nodes to control handling, by those other data handling nodes, of any further instances of the data at the given memory address which are held by those other data handling nodes.

11 Claims, 10 Drawing Sheets

(56) References Cited

U.S. PATENT DOCUMENTS

| | | | |
|---|---|---|---|
| 10,402,349 B2* | 9/2019 | Filippo | G06F 12/0833 |
| 2003/0163543 A1* | 8/2003 | Deneroff | G06F 12/0826 |
| | | | 709/214 |
| 2007/0022252 A1* | 1/2007 | Cen | G06F 12/0817 |
| | | | 711/141 |
| 2008/0109585 A1 | 5/2008 | DeMent et al. | |
| 2008/0320231 A1 | 12/2008 | Kinter et al. | |
| 2014/0052921 A1 | 2/2014 | Biles et al. | |
| 2014/0310468 A1 | 10/2014 | Speier et al. | |
| 2018/0095906 A1* | 4/2018 | Doshi | G06F 13/1663 |
| 2018/0150315 A1 | 5/2018 | Dunham et al. | |
| 2018/0157437 A1 | 6/2018 | Sandberg et al. | |
| 2018/0173660 A1* | 6/2018 | Geng | G06F 13/364 |
| 2018/0225232 A1* | 8/2018 | Filippo | G06F 12/0833 |
| 2019/0079868 A1* | 3/2019 | Jalal | G06F 12/0815 |

\* cited by examiner

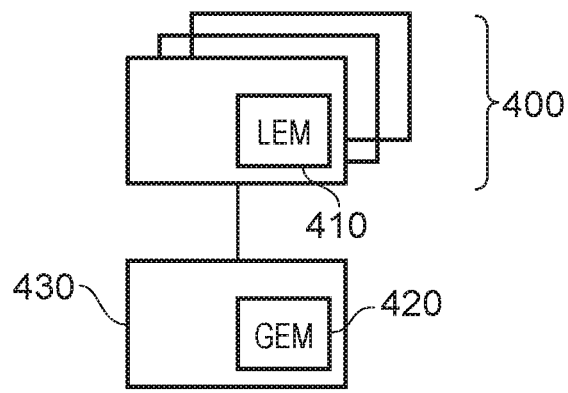
FIG. 4b
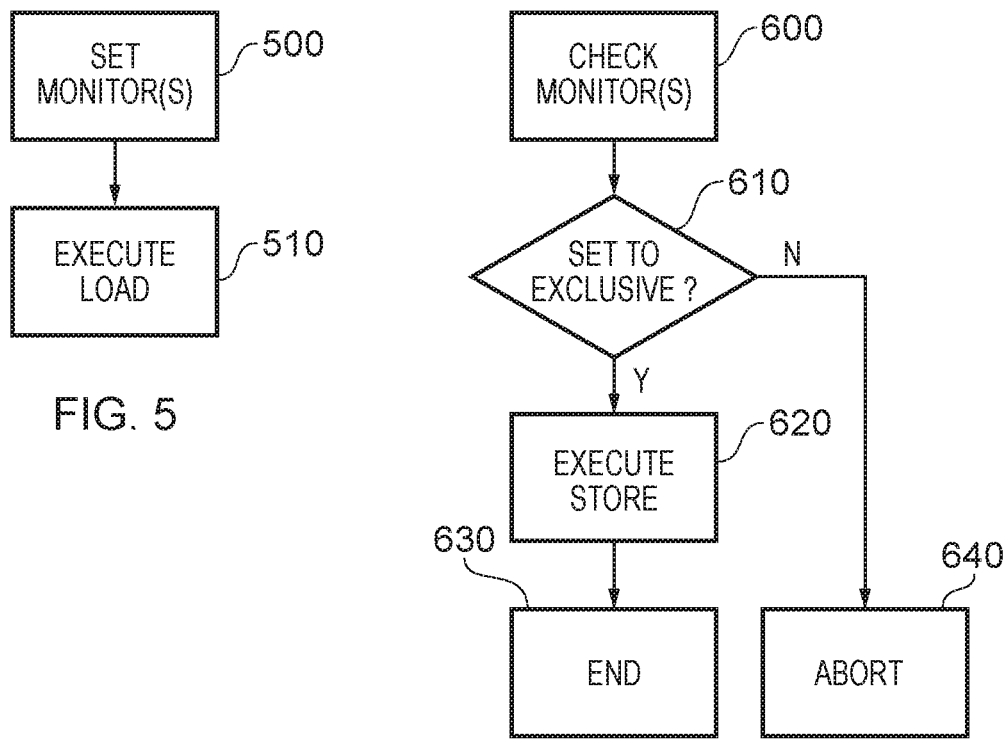
FIG. 5
FIG. 6

US 11,269,773 B2

EXCLUSIVITY IN CIRCUITRY HAVING A HOME NODE PROVIDING COHERENCY CONTROL

BACKGROUND

This disclosure relates to circuitry and methods.

Data transfer protocols can regulate the operation of data transfers between devices or nodes connected to one another via interconnect circuitry, for example in the context of a system on chip (SoC) or network on chip (NoC) system. An example of such a data transfer protocol is the so-called AMBA (Advanced Microcontroller Bus Architecture) CHI (Coherent Hub Interface) protocol.

In the CHI protocol, nodes can be categorised as request nodes (RN), home nodes (HN) or slave nodes (SN). Nodes can be fully coherent or input/output (I/O) coherent. A fully coherent HN or RN (HN-F, RN-F respectively) includes coherent cache storage; a fully coherent SN (SN-F) is paired with an HN-F. An HN-F can manage coherency and/or serialisation for a memory region, and may be referred to as an example of a point of coherency (POC) and/or point of serialisation (POS).

Here, the term "coherent" implies that that data written to a memory address in the coherent memory system by one node is consistent with data subsequently read from that memory address in the coherent memory system by another of the nodes. A role of logic associated with the coherence function is therefore to ensure that before a data handling transaction takes place, an up to date copy is provided. If another node alters its copy, the coherence system will invalidate other copies which then have to be re-obtained if needed. Similarly, if the data handling transaction involves modifying a data item, then coherence logic avoids conflicts with other existing copies of the data item.

Serialisation relates to the ordering of the handling of memory access requests from potentially multiple requesting nodes, and potentially taking different latency periods to be serviced, so that the results from those requests are presented in the correct order to the requesting nodes, and any dependencies between the requests (for example, a data read subsequent to a data write to the same address) are correctly handled.

Data accesses such as read requests may be made via the HN-F, which may either service the read request itself (for example, by accessing a cache memory) or may refer the read request to an SN-F for resolution, for example, if the required data item has to be read from main memory or a higher level cache memory. In such examples, the SN-F may comprise a dynamic memory controller (DMC) associated with a memory such as a dynamic random access memory (DRAM). The HN-F handles the issuing of a read request to the SN-F in instances in which the HN-F cannot itself service the request.

SUMMARY

In an example arrangement there is provided circuitry comprising:

a set of two or more data handling nodes each having respective storage circuitry to hold data; and a home node to serialise data access operations and to control coherency amongst data held by the one or more data handling nodes so that data written to a memory address is consistent with data read from that memory address in response to a subsequent access request;

in which:

a requesting node of the set of data handling nodes is configured to communicate a request to the home node for exclusive access to a given instance of data at a given memory address; and the home node is configured, in response to the request, to communicate information to other data handling nodes of the set of data handling nodes to control handling, by those other data handling nodes, of any further instances of the data at the given memory address which are held by those other data handling nodes.

In another example arrangement there is provided a method comprising:

holding data, by a set of two or more data handling nodes;

serialising, by a home node, data access operations;

controlling, by the home node, coherency amongst data held by the one or more data handling nodes so that data written to a memory address is consistent with data read from that memory address in response to a subsequent access request;

communicating, by a requesting node of the set of data handling, a request to the home node for exclusive access to a given instance of data at a given memory address; and communicating, by the home node and in response to the request, information to other data handling nodes of the set of data handling nodes to control handling, by those other data handling nodes, of any further instances of the data at the given memory address which are held by those other data handling nodes.

In another example arrangement there is provided circuitry comprising:

a set of two or more data handling nodes each having respective storage circuitry to hold data; and a home node to serialise the execution of data access operations and to control coherency amongst data held by the one or more data handling nodes so that data written to a memory address is consistent with data read from that memory address in response to a subsequent access request;

in which:

a requesting node of the set of data handling nodes is configured to initiate a sequence of operations requiring exclusive access to data at a given memory address, the sequence of operations including an exclusive store operation to the given memory address; and the home node is configured, prior to executing the exclusive store operation, to detect whether the requesting node currently holds an instance of data at the given memory address by issuing a request to the requesting node, the request being for the requesting node to indicate to the home node whether the requesting node currently holds an instance of data at the given memory address, and to selectively execute the exclusive store operation in response to the detection.

In another example arrangement there is provided a method comprising:

holding data, by a set of two or more data handling nodes;

serialising, by a home node, data access operations;

controlling, by the home node, coherency amongst data held by the one or more data handling nodes so that data written to a memory address is consistent with data read from that memory address in response to a subsequent access request;

initiating, by a requesting node of the set of data handling nodes, a sequence of operations requiring exclusive access to data at a given memory address, the sequence of operations including an exclusive store operation to the given memory address;

detecting, by the home node and prior to executing the exclusive store operation, whether the requesting node currently holds an instance of data at the given memory address, the detecting step comprising issuing a request to the requesting node, the request being for the requesting node to indicate to the home node whether the requesting node currently holds an instance of data at the given memory address; and selectively executing the exclusive store operation in response to the detection.

In another example arrangement there is provided circuitry comprising:

a set of two or more data handling nodes each having respective storage circuitry to hold data; and a home node to serialise the execution of data access operations and to control coherency amongst data held by the one or more data handling nodes so that data written to a memory address is consistent with data read from that memory address in response to a subsequent access request;

in which:

a requesting node of the set of data handling nodes is configured to initiate an exclusivity request transaction in respect of a given memory address; and the home node is configured, in response to the exclusivity request transaction, to detect whether, at execution of the exclusivity request transaction, the requesting node is storing an instance of data at the given memory address and, when the requesting node is detected to be storing an instance of data at the given memory address, to instruct other data handling nodes of the set of data handling nodes to invalidate any further instances of the data at the given memory address.

In another example arrangement there is provided a method comprising:

holding data, by a set of two or more data handling nodes;

serialising, by a home node, data access operations;

controlling, by the home node, coherency amongst data held by the one or more data handling nodes so that data written to a memory address is consistent with data read from that memory address in response to a subsequent access request;

initiating, by a requesting node of the set of data handling nodes an exclusivity request transaction in respect of a given memory address;

detecting, by the home node and in response to the exclusivity request transaction, whether, at execution of the exclusivity request transaction, the requesting node is storing an instance of data at the given memory address; and instructing, by the home node when the requesting node is detected to be storing an instance of data at the given memory address, other data handling nodes of the set of data handling nodes to invalidate any further instances of the data at the given memory address.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

FIG. 4b schematically illustrates the use of exclusive monitors;
FIGS. 5 and 6 are schematic flowcharts illustrating respective methods.

DESCRIPTION OF EMBODIMENTS

Figure 1:
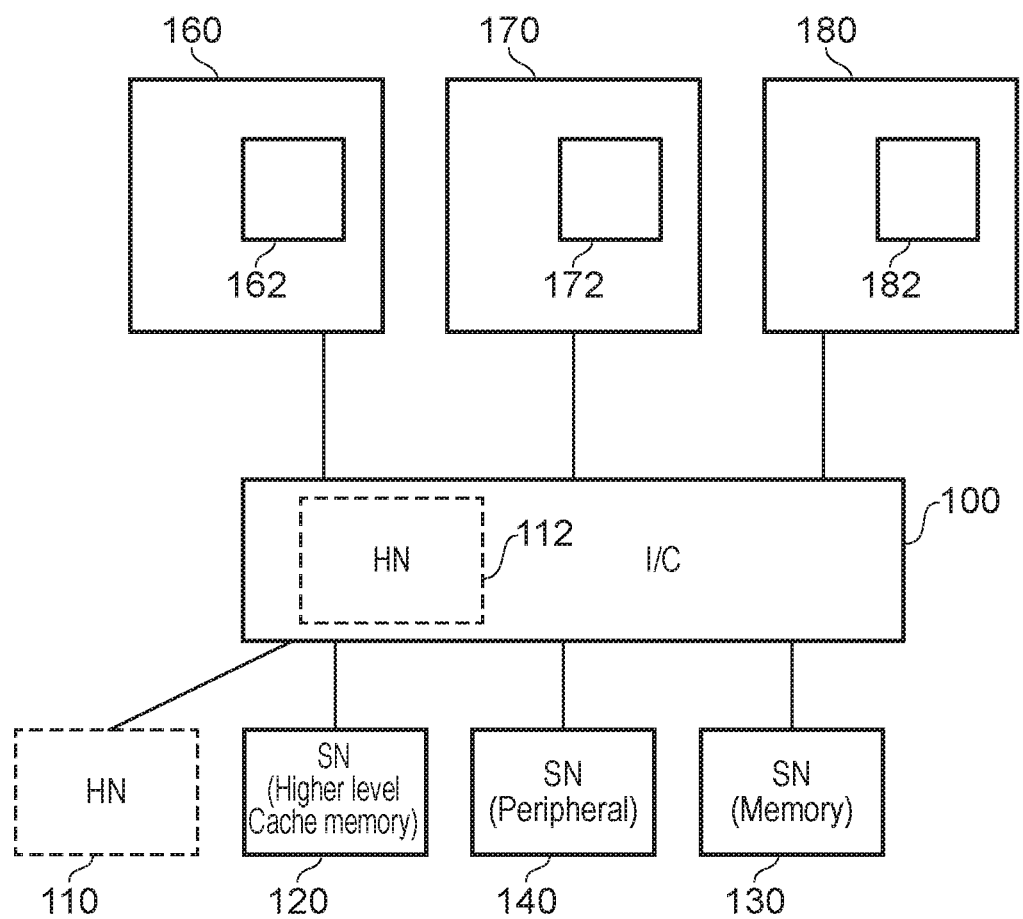
FIG. 1 schematically illustrates an example circuitry.

Before discussing the embodiments with reference to the accompanying figures, the following description of embodiments is provided.

An example embodiment provides circuitry comprising a set of two or more data handling nodes each having respective storage circuitry to hold data; and a home node to serialise data access operations and to control coherency amongst data held by the one or more data handling nodes so that data written to a memory address is consistent with data read from that memory address in response to a subsequent access request; in which: a requesting node of the set of data handling nodes is configured to communicate a request to the home node for exclusive access to a given instance of data at a given memory address; and the home node is configured, in response to the request, to communicate information to other data handling nodes of the set of data handling nodes to control handling, by those other data handling nodes, of any further instances of the data at the given memory address which are held by those other data handling nodes.

In example embodiments, in response to a particular requesting node (RN) requesting exclusive access to a given address (such as a cache line or lines), the home node or HN can initiate various actions or detections at other nodes which may hold the line. The given instance is an instance held at the requesting node. Examples of the actions which can be initiated include the home node being configured to initiate the communication of the data at the given memory address to the requesting node. In other examples, the home node may be configured to control a detection of whether each of the other data handling nodes is currently conducting an exclusive access operation in respect of the given memory address. If so, which is to say that one of the other data handling nodes is detected to be currently conducting an exclusive access operation in respect of the given memory address, that one of the other data handling nodes may be configured to retain an instance of the data at the given memory address and to indicate to the home node that the given memory address has a status of shared between that one of the other data handling nodes and the requesting node. However, if not, which is to say that one of the other data handling nodes is detected not to be currently conducting an exclusive access operation in respect of the given memory address, that one of the other data handling nodes may be configured to invalidate an instance of the data at the given memory address held at that one of the other data handling nodes.

In some examples, the operation of the home node can be assisted by the home node being configured to maintain snoop data indicating instances of data stored at one or more of the set of data handling nodes.

Another example embodiment provides a method comprising holding data, by a set of two or more data handling nodes; serialising, by a home node, data access operations;

controlling, by the home node, coherency amongst data held by the one or more data handling nodes so that data written to a memory address is consistent with data read from that memory address in response to a subsequent access request; communicating, by a requesting node of the set of data handling, a request to the home node for exclusive access to a given instance of data at a given memory address; and communicating, by the home node and in response to the request, information to other data handling nodes of the set of data handling nodes to control handling, by those other data handling nodes, of any further instances of the data at the given memory address which are held by those other data handling nodes.

Another example embodiment provides circuitry comprising a set of two or more data handling nodes each having respective storage circuitry to hold data; and a home node to serialise the execution of data access operations and to control coherency amongst data held by the one or more data handling nodes so that data written to a memory address is consistent with data read from that memory address in response to a subsequent access request; in which: a requesting node of the set of data handling nodes is configured to initiate a sequence of operations requiring exclusive access to data at a given memory address, the sequence of operations including an exclusive store operation to the given memory address; and the home node is configured, prior to executing the exclusive store operation, to detect whether the requesting node currently holds an instance of data at the given memory address by issuing a request to the requesting node, the request being for the requesting node to indicate to the home node whether the requesting node currently holds an instance of data at the given memory address, and to selectively execute the exclusive store operation in response to the detection.

Example embodiments can provide an arrangement by which an exclusive store can be selectively executed in dependence upon whether, at the time of execution of the exclusive store, the requesting node still holds a copy of the relevant memory address such as a cache line. The use of this arrangement can help to avoid so-called live-lock situations resulting from exclusive contention between processes, cores or nodes.

In some examples, the home node is configured to execute the exclusive store operation when the home node detects that the requesting node currently holds an instance of data at the given memory address The operations of the home node can be assisted by the home node being configured to maintain control data at least partly indicating which data is currently held by the storage circuitry of the data handling nodes.

The sequence of operations referred to above may comprise applying and subsequently releasing an exclusive tag for at least the given memory address.

Another example embodiment provides a method comprising holding data, by a set of two or more data handling nodes; serialising, by a home node, data access operations; controlling, by the home node, coherency amongst data held by the one or more data handling nodes so that data written to a memory address is consistent with data read from that memory address in response to a subsequent access request; initiating, by a requesting node of the set of data handling nodes, a sequence of operations requiring exclusive access to data at a given memory address, the sequence of operations including an exclusive store operation to the given memory address; detecting, by the home node and prior to executing the exclusive store operation, whether the requesting node currently holds an instance of data at the given memory address, the detecting step comprising issuing a request to the requesting node, the request being for the requesting node to indicate to the home node whether the requesting node currently holds an instance of data at the given memory address; and selectively executing the exclusive store operation in response to the detection.

Another example embodiment provides circuitry comprising a set of two or more data handling nodes each having respective storage circuitry to hold data; and a home node to serialise the execution of data access operations and to control coherency amongst data held by the one or more data handling nodes so that data written to a memory address is consistent with data read from that memory address in response to a subsequent access request; in which: a requesting node of the set of data handling nodes is configured to initiate an exclusivity request transaction in respect of a given memory address; and the home node is configured, in response to the exclusivity request transaction, to detect whether, at execution of the exclusivity request transaction, the requesting node is storing an instance of data at the given memory address and, when the requesting node is detected to be storing an instance of data at the given memory address, to instruct other data handling nodes of the set of data handling nodes to invalidate any further instances of the data at the given memory address.

In example embodiments a unique copy of a memory address such as a cache line can be provided at a node by the home node instructing other nodes to invalidate their own copies.

In examples, when the requesting node is detected not to be storing an instance of data at the given memory address, the home node is configured not to instruct other data handling nodes of the set of data handling nodes to invalidate any further instances of the data at the given memory address.

In some examples, the detection of whether the requesting node currently holds an instance of data at the given memory address by issuing a request to the requesting node, the request being for the requesting node to indicate to the home node whether the requesting node currently holds an instance of data at the given memory address. In other examples, the home node can refer to snoop data indicating instances of data stored at one or more of the set of data handling nodes, particularly where so-called precise snoop data is used, which is to say that the snoop data is configured to indicate instances of data stored at each of the set of data handling nodes; and the home node is configured to detect whether, at execution of the exclusivity request transaction, the requesting node is storing an instance of data at the given memory address by reference to the snoop data.

Another example embodiment provides a method comprising holding data, by a set of two or more data handling nodes; serialising, by a home node, data access operations; controlling, by the home node, coherency amongst data held by the one or more data handling nodes so that data written to a memory address is consistent with data read from that memory address in response to a subsequent access request; initiating, by a requesting node of the set of data handling nodes an exclusivity request transaction in respect of a given memory address; detecting, by the home node and in response to the exclusivity request transaction, whether, at execution of the exclusivity request transaction, the requesting node is storing an instance of data at the given memory address; and instructing, by the home node when the requesting node is detected to be storing an instance of data at the given memory address, other data handling nodes of the set of data handling nodes to invalidate any further instances of the data at the given memory address.

Another example embodiment provides a snoop query or similar transaction (and/or circuitry to issue and/or handle such a transaction), which returns a current state (such as a coherency state) of a cache line or other data item but does not return data or change the state of the cache line or other data item.

Overview of Circuitry

Referring now to the drawings, FIG. 1 schematically illustrates circuitry embodied as a network of devices interconnected by an interconnect 100. The apparatus may be provided as a single integrated circuit such as a so-called system on chip (SoC) or network on chip (NoC) or as a plurality of interconnected discrete devices.

Various so-called nodes are connected via the interconnect 100. These include one or more home nodes (HN) 110 which oversee data coherency within the networked system, one or more slave nodes (SN) such as a higher level cache memory 120 (the reference to "higher level" being with respect to a cache memory provided by a requesting node and described below), a main memory 130 and a peripheral device 140. The selection of slave nodes shown in FIG. 1 is by way of example, and zero or more of each type of slave node may be provided.

In other examples, the functionality of the HN may be provided by HN circuitry 112 of the interconnect 100. For this reason, the HN 110 and the HN circuitry 112 are both shown in broken line; in general terms, a single HN is provided for a particular memory region to oversee coherency amongst the various nodes, but it is a matter of design choice whether or not to implement that HN functionality at the interconnect or elsewhere. The memory space may be partitioned between multiple HNs.

FIG. 1 also shows a plurality of so-called requesting nodes (RN) 160, 170, 180, which operate according to the CHI (coherent hub interface) protocol.

The nodes can be fully coherent or input/output (I/O) coherent. A fully coherent HN or RN (HN-F, RN-F respectively) includes coherent cache storage. A fully coherent SN (SN-F) is paired with an HN-F. An HN-F can manage coherency for a memory region. In the present example, the RNs 160-180 are fully coherent RN (RN-F) each having an associated cache memory 162, 172, 182 as an example of storage circuitry at that node to hold data.

In example arrangements, each of the one or more slave nodes may be configured to accept each data transmission directed to that slave node independently of any other data transmissions directed to that slave node.

Therefore, the arrangement of FIG. 1 provides an example of circuitry comprising a set of two or more data handling nodes 160, 170, 180 each having respective storage circuitry 162, 172, 182 to hold data; and a home node 110/112 to serialise data access operations and to control coherency amongst data held by the one or more data handling nodes so that data written to a memory address is consistent with data read from that memory address in response to a subsequent access request.

Data can be handled within the arrangement of FIG. 1 by so-called transactions. In respect of any particular transaction, a node which initiates the transaction (for example by issuing a request message) is referred to as the requesting node or master for that transaction. So, although there are multiple RNs shown in FIG. 1, for any particular transaction one of these will be the RN in respect of that transaction. The HN receives the request message from the relevant RN and handles the execution of that transaction while maintaining coherency amongst the data held by the various nodes.

Home Node

Figure 2:
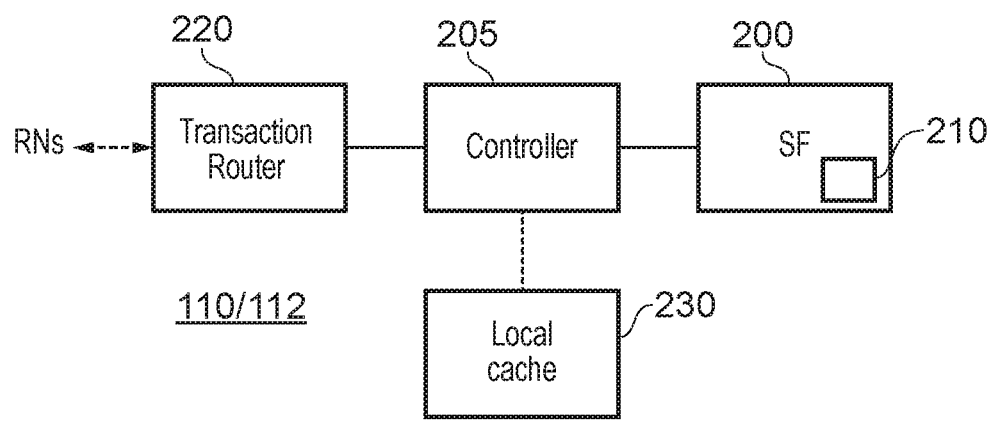
FIG. 2 schematically illustrates a home node.

FIG. 2 schematically illustrates the operation of the home node 110 in terms of its functionality as a cache coherency controller including a snoop filter.

The term "snoop filter" is a historical one and is used here to refer (for example) to a control device which may have an associated "directory", where the directory stores information indicating which data is stored in which cache, and the snoop filter itself at least contributes to the handling of data accesses to cached information so as to provide a cache coherence function.

The cache functionality controller includes the snoop filter in the present embodiments. The snoop filter can provide some or all of the functionality relating to overseeing the handling of data accesses across a cache coherent system.

In FIG. 2 a snoop filter 200, having the directory 210 as discussed above is associated with a controller 205 and a transaction router 220. The transaction router 220 is in data communication with one or more RNs having cache memories. Each RN may have an associated agent (not shown in FIG. 2) responsible for the local handling of data read and write operations with respect to that cache memory. The HN may itself have a cache memory 230 under the oversight (for coherency purposes) of the HN.

The snoop filter 200 handles at least a part of a process under which, when any of the RNs of FIG. 1 intends to access or modify data which is stored as a cache line in any of the cache memories, that node obtains permission to do so. As part of this process, the snoop filter 200 checks whether any other cache memories have a copy of the line which is to be modified. If any other copies are in existence at other cache memories, then those copies need to be cleared and invalidated. If those copies themselves contain modifications to the stored data in that line, then in at least some circumstances, the controller 205 (or the snoop filter 200) instructs the cache memory to write that line back to main memory.

In the case of a read access by a node with respect to data stored in a cache memory, it is important that the RN requesting the read has access to the latest correct version of the cached data. The controller 205 oversees this process so that if another cache has a recently-modified version of the required data, that other cache writes back the modified version and/or forwards a copy of the modified version for caching at the currently requesting node.

A snoop operation or query may also be initiated by the circuitry of FIG. 2. This may involve sending a message to a cache memory which is indicated, by the directory, to be caching a memory address being accessed by another cache memory, and receiving a response from the cache memory which received the message, the response indicating whether that cache memory is actually caching that memory address. Example snoop operations will be discussed further below.

In many practical examples of a data processing system of the type shown in FIG. 1, nearly all of the checks carried out by the snoop filter 200 might be expected to miss, which is to say they would not uncover replication of data between multiple caches. But nevertheless, the checks carried out by the snoop filter 200 are essential to maintaining cache coherence. In order to improve the efficiency of the process and to allow the snoop filter 200 to avoid making checks which are definitely going to miss, the snoop filter 200 maintains the directory 210 indicating to the snoop filter 200 which data is stored at which cache. In some examples this can allow the snoop filter 200 to reduce the number of snoop operations (by avoiding carrying out such operations where a particular line is not held in any cache, or is held only at the cache corresponding to the node which is currently accessing that data). In examples it can also allow data communications relating to snoop operations to be better targeted (for example as unicast or multicast communications) to the appropriate cache(s) rather than to be broadcast as snoop operations to all of the caches.

Therefore, when a potential snoop operation is initiated, the snoop filter 200 may consult the directory 210 to detect whether the information in question is held in one or more of the caches. If a snoop operation is indeed needed to enquire as to the current status of the data at one or more caches, then the snoop filter 200 can carry out that enquiry as a unicast or multicast communication (rather than a broadcast communication) as appropriate.

Various levels of so-called "precision" are available in the design of the snoop filter directory 210.

In some examples, a "precise" snoop filter is used, which is to say that the snoop filter 200 is a so-called inclusive snoop filter implying that it has an ongoing requirement to maintain a complete listing of all data held by all of the caches which are subject to cache coherence. In order to do this, the snoop filter 200 (as part of the HN 110/112) needs to be informed by an agent associated with a cache memory that a cache insertion has taken place. But in order to perform this function efficiently, it should also be informed by the agent if a cache line has been evicted (removed from) that cache memory, either as a simple deletion or invalidation (in the case of unmodified data) or as a write-back to main memory (for modified data). Signalling an eviction is the responsibility of the respective coherent agent. However, some operational protocols associated with multiple caches can recommend the signalling of evictions but do not necessarily mandate it. In any case, there may be circumstances whereby a cache memory may not always be able to signal all evictions because of software errors, for example in a virtual memory system, or memory errors.

Therefore, maintaining a precise snoop filter directly can be onerous from the point of view of processing requirements. In the case of a large system having many distributed cache memories, the storage size needed to provide a precise snoop filter directory can also be very significant.

In other examples, therefore, different levels of imprecision are available to the snoop filter, while still providing some useful functionality to the snoop filter operation.

For example, the snoop filter may keep a complete record of writes to the cache memories but may not keep a complete record of cache evictions.

In other examples, the snoop filter may indicate the location of a cache line if it is held by no more than a predetermined number of RNs; if more than that number holds the line then the precise location of each instance of the data is not recorded but instead a flag is recorded to indicate that the line is held in (or at least has been stored to) multiple locations.

It is noted that in the case of a snoop filter other than a "precise" snoop filter directory, the snoop filter cannot generate a definitive answer as to where a line is currently stored, and its status at that location, purely by using information maintained and held at the snoop filter.

Cache Memory

Figure 3:
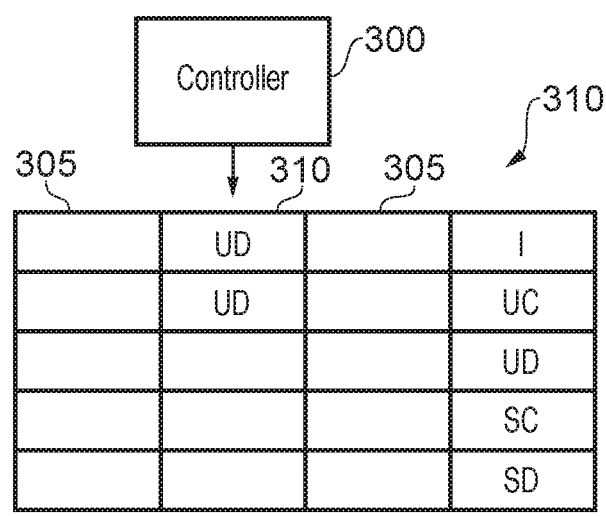
FIG. 3 schematically illustrates a cache memory.

FIG. 3 schematically illustrates aspects of a cache memory, for example being the local cache memory 230 at the HN or one of the cache memories at an RN as discussed above.

A controller 300 (acting as an agent as mentioned above) controls writing to, reading from and eviction from memory storage 310. Associated with each cache line 305 stored in the storage 310 is a status indication (drawn, purely for schematic purposes, horizontally to the right of the relevant cache line). The controller 300 can change and/or report the status of a cache line according to operations conducted locally and/or in response to instructions received from the HN as appropriate. Note that the particular cache memory structure, for example a set-associative structure, is not relevant to the present discussion.

Example statuses include invalid (I); Unique Clean (UC), indicating that this is a uniquely held copy that does not currently require writing back to main memory; Unique Dirty (UD) indicating that this is a uniquely held copy which differs from that held in main memory and so at some point will require writing back to main memory; Shared Clean (SC) indicating a shared copy (held in multiple cache memories) which is clean; and Shared Dirty (SD) indicating a shared copy that will at some point require writing back to main memory. Note that the "dirty" indication does not necessarily indicate that the copy differs from main memory, but rather that the RN at which it is held has the responsibility to write it back to memory. Note also that in the situation of shared copies, only one of these is ever marked as "dirty" in at least some example protocols. Other shared copies may coexist with the SD copy, but in a SC status.

Exclusive Transactions

So-called exclusive memory transactions and exclusive sequences will now be described.

An exclusive sequence, formed of exclusive memory transactions, does not prevent other accesses to the memory address or cache line(s) in question but does allow a detection of whether an intervening access has taken place, in which case the exclusive transaction aborts.

Figure 4A:
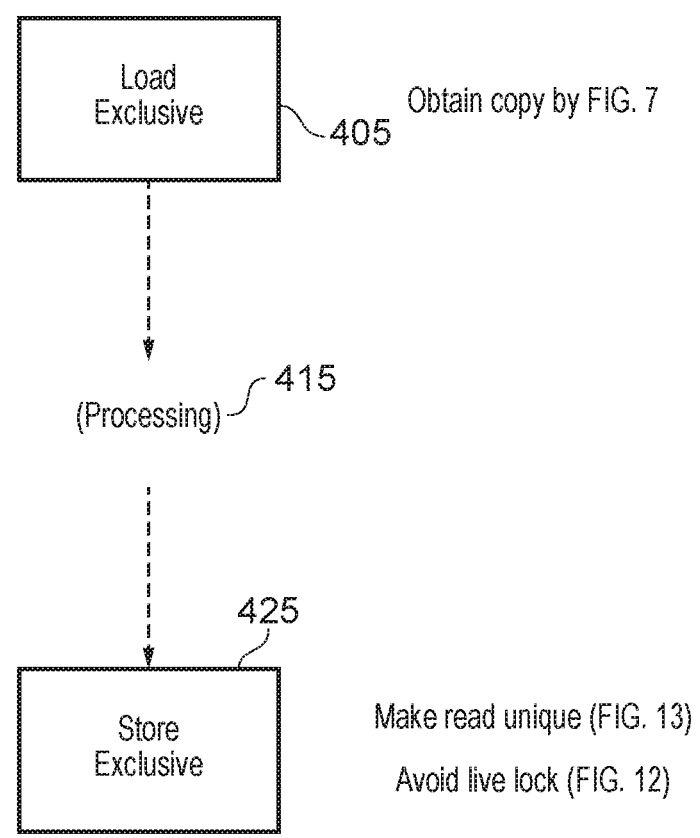
FIG. 4a schematically illustrates an exclusive sequence.

An overview of an exclusive sequence is illustrated schematically in FIG. 4a. The process starts with an exclusive load (sometimes abbreviated to LDREX) 405. At this stage, if the RN concerned does not already have a copy of the data item (for example, cache line) which it needs, it can obtain one using for example the techniques of FIG. 7. In those techniques to be described below, the RN would prefer to obtain a unique copy but can proceed (at this stage anyway) with a shared copy. It is important at this stage that in trying to obtain a unique copy the RN does not invalidate another node's copy if that other node is part way through an exclusive sequence for that line itself. If the RN already has a shared copy then no further action is required in terms of obtaining a copy of the line.

Some processing 415 then takes place with respect to the relevant line. The amount of time taken by this processing is not defined and can be variable. In other words, there is not a predefined interval between the exclusive load 405 and a subsequent exclusive store 425.

If the line is invalidated at the RN between the steps 405 and 425, the sequence will fail and will probably need to be retried.

At the exclusive store 425, there is a need at the RN to transition to the unique state for that cache line. The exclusive store is then implemented locally resulting in a unique dirty line held at the RN.

Two other techniques to be described below are relevant here. The technique of FIG. 12 addresses an issue which could occur if the RN were to lose the cache line (it were to be invalidated) in between initiating an exclusive store transaction and that operation being issued for execution by the HN. The technique of FIG. 13 to be described below enhances this approach by returning data in a shared state if the line has been invalidated As shown schematically in FIG. 4b, exclusive memory access may be controlled by so-called exclusive monitors. An exclusive monitor may be considered to be a simple state machine having just two possible states: "open" and "exclusive".

By setting the exclusive monitor and subsequently checking its state, a memory transaction may be able to detect whether any other intervening action has access to the memory address or addresses covered by the exclusive monitor. In a distributed system such as that shown in FIG. 1, each RN 400 may have a respective "local exclusive monitor" (LEM) 410 associated with the respective RN (or indeed with a processing core within the RN). In some example arrangements, the LEM may be integrated with the load-store unit of the relevant core.

A global exclusive monitor or GEM 420 may be associated with multiple nodes and may be provided, for example, at the home node 430 so as to track exclusivity for a number of potential addresses from a number of potential processing elements.

Some example arrangements employ both local and global exclusive monitors.

In operation, as mentioned above, the exclusive monitors may act as two-state state machines, moveable between the pair of states mentioned above.

FIGS. 5 and 6 provide schematic flowcharts illustrating example ways in which exclusive monitoring can be used.

Referring to FIG. 5, in order to initiate a so-called exclusive load operation, at a step 500 one or more exclusive monitors (whether LEM or GEM or both) relevant to the load operation are set, which is to say their state is moved to or retained at the "exclusive" state. Then, at a step 510, the exclusive load is executed.

Referring to FIG. 6, in order to perform a corresponding exclusive store operation, at a step 600 the one or more exclusive monitors relevant to that exclusive store are checked. If they are still in the "exclusive" state (as detected at a step 610) then control passes to a step 620 at which the store is executed and at a step 630 the process ends successfully.

If the answer is no at the step 610 then the process aborts at a step 640.

So, the use of the exclusive monitors allows a detection to be made as to whether an intervening process has already written back to the relevant address or addresses, in which case the exclusive store is itself aborted.

A fundamental principle of operation for exclusive accesses of this type is that when multiple agents are contending for the exclusive access, it is the "first to store" that succeeds. This feature derives from the observation that an exclusive load followed by an exclusive store is not necessarily an atomic operation and is in fact permitted to have any number of instructions between the load and store portions.

A potential problem can occur if multiple agents were to start an exclusive sequence in a staggered fashion, and each time a sequence is started it prevents the completion of another exclusive sequence. It is possible in such circumstances for a so-called "live-lock" to occur such that no sequence ever reaches completion and all of the agents end up having to repeat their respective sequences.

Example 1: Load Exclusive

In a hardware coherent system of the type described with reference to FIG. 1, performance can potentially be improved if a particular RN is able to obtain a data item (for example a cache line) in a unique state when starting the execution of an exclusive sequence, as this allows the exclusive store operation to be performed locally without the need to issue a transaction to the home node and involve the coherency control arrangement discussed above.

Figure 7:
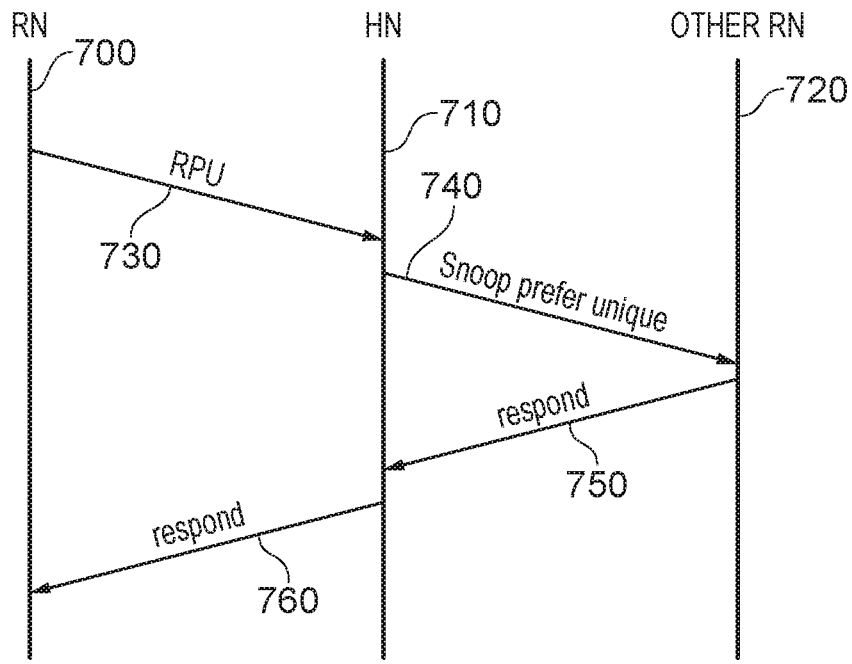
FIG. 7 is a schematic timeline representation.

Referring to FIG. 7, a time-based chart is provided in which time generally progresses down the page as drawn and operations are indicated as between a requesting node 700, the home node 710 and other RNs 720.

The RN 700 makes a request referred to here as "read prefer unique" (RPU) 730 in order to obtain a copy of the cache line in question. This indicates to the HN that the RN 700 would prefer to have a particular cache line in a unique state for performance reasons, but that the RN will accept the cache line in a shared state if that is necessary to meet the requirements of other exclusive access sequences. The RPU is issued as a transaction by the RN 700 to the HN 710.

In the present examples, determining whether other agents in the overall system in FIG. 1 are halfway through their own exclusive sequence is performed using a snoop based detection of exclusive contention. A snoop prefer unique 740 is issued by the HN to other RNs. This query has various functions. It indicates that the particular cache line specified by the query should be invalidated if it is not currently in use within an exclusive sequence. However, if the line is currently in use in an exclusive sequence than a recipient RN should, in response to the snoop prefer unique 740, retain its copy. Further details will be provided below.

The step 740 is therefore an example of the home node being configured to control a detection of whether each of the other data handling nodes is currently conducting an exclusive access operation in respect of the given memory address.

FIG. 7 also shows a response 750 from the other RN to the HN, and a response 760 from the HN to the RN 700.

Figure 8:
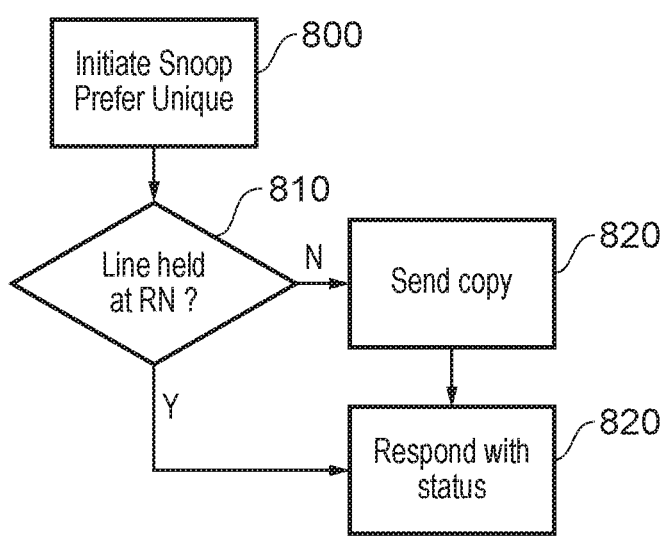
FIGS. 8 to 10 are schematic flowcharts illustrating respective methods.

In terms of operations at the home node 710, references made to a schematic flowchart of FIG. 8 in which, in response to receipt of the RPU transaction 730, the HN initiates a snoop prefer unique 740 at a step 800. The HN also detects whether the relevant cache line is held at the originating RN 700, at a step 810 (although in some examples this test is not needed because the context of a read prefer unique can in fact imply that the originating RN does not already have a copy). If not, then the HN 710 sends a copy to the originating RN at a step 820 (at which when the requesting node does not hold an instance of the data at the given memory address, the home node is configured to initiate the communication of the data at the given memory address to the requesting node) and then in either case, the HN sends the response 760 at a step 830.

Figure 9:
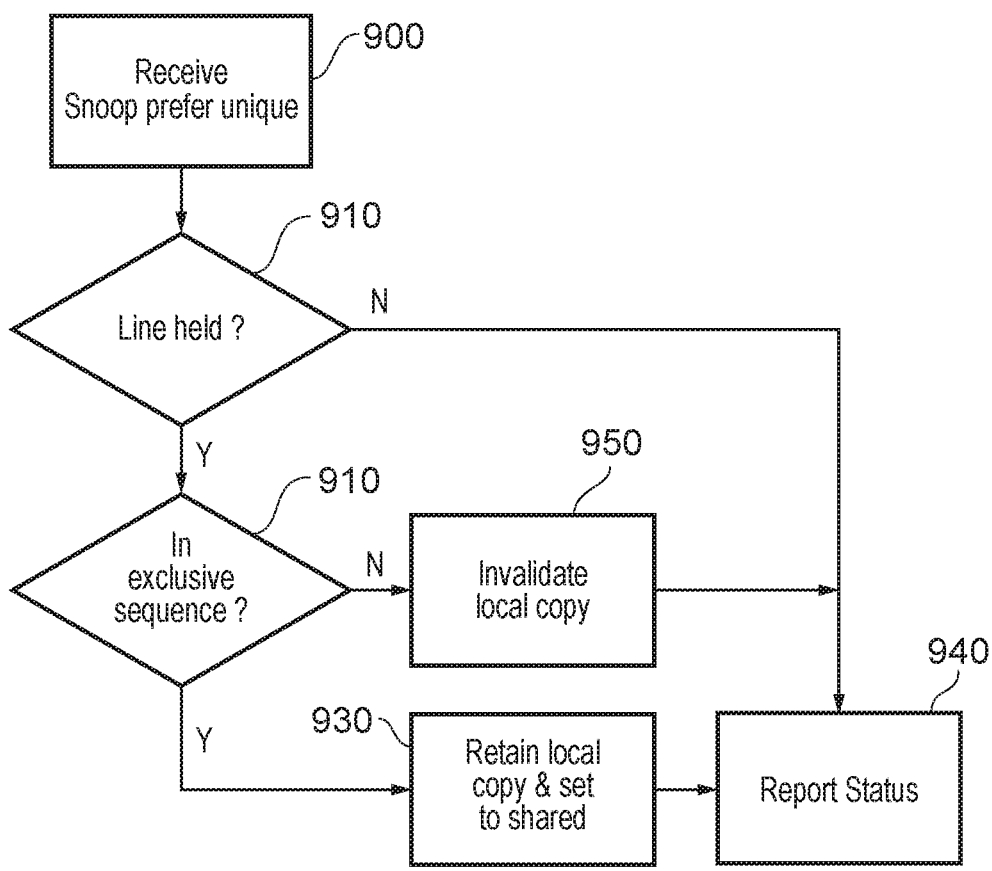

FIG. 9 schematically illustrates operations at each of the other RNs which receive the snoop prefer unique 740 at a step 900.

At a step 910, if the relevant line specified by the snoop prefer unique 740 is held at that recipient RN then control passes to a step 920 at which a detection is made, for example using the local exclusive monitor relevant to the cache line, whether the address is involved in an exclusive sequence at that recipient RN. If the answer is yes then at a step 930 the local copy is retained and the status of it is set to "shared". Control then passes to a step 940 at which the response 750 indicating the status of the line is returned to the HN 710.

Returning to the step 910, if the relevant line was not held at the recipient RN then a simple response indicating "not held" or "invalid" is provided at the step 940.

Returning to the step 920, if the line was held but was not in an exclusive sequence, then at a step 950 the local copy is invalidated and control passes to the step 940 at which the status ("invalid") is returned as the response 750.

It is always legal for the recipient RN to respond by indicating that it has retained the relevant line and moved to a shared state. The recipient RN does not invalidate its own copy of the line if it is in the process of an exclusive sequence.

Figure 10:
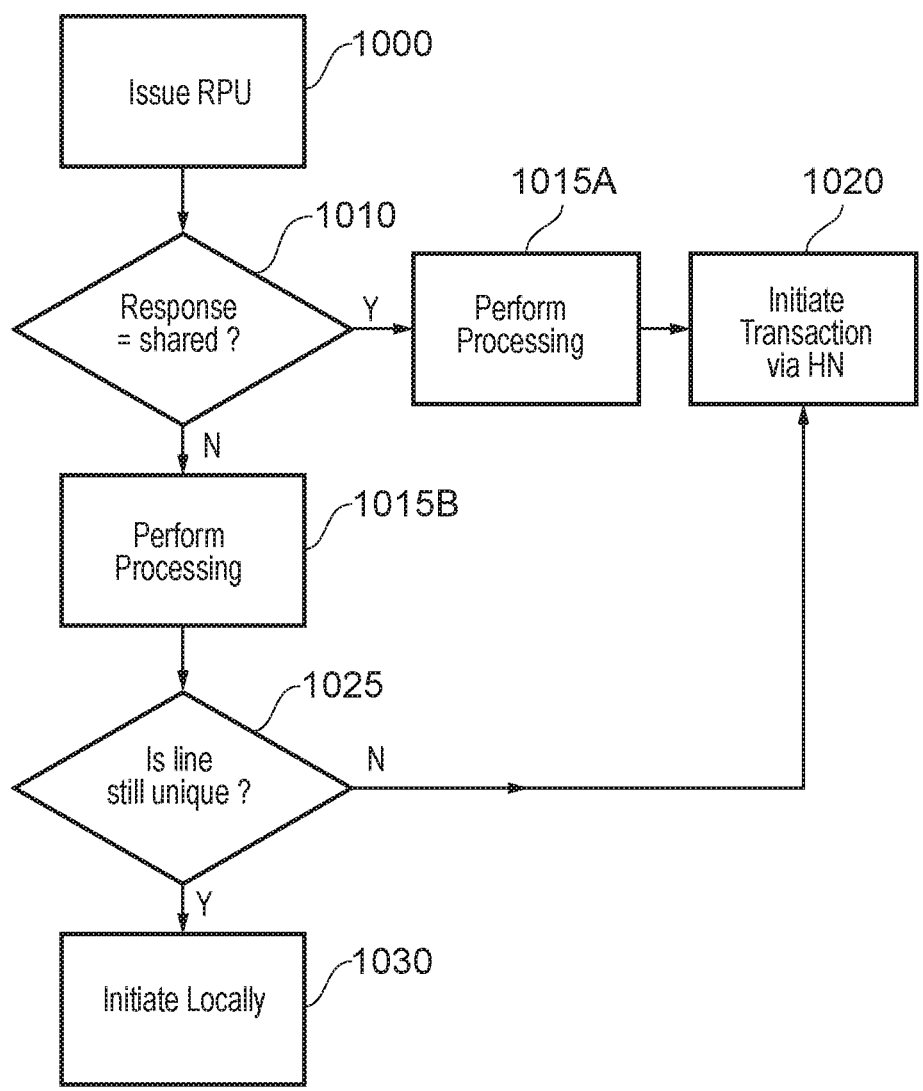

FIG. 10 refers to operations at the RN 700 which, at a step 1000 issues the RPU transaction 730. On receiving the response 760, at a step 1010, if the response indicates that the line is "shared" then control passes to a step 1015A at which the processing relevant to the sequence is performed. The RN 700 goes on to initiate the exclusive transaction via the HN 710 at a step 1020.

If the outcome of the step 1010 is negative, then control passes to a step 1015B at which the processing relevant to the sequence is performed. Note that the steps 1015A/B are denoted in this way using "A" and "B" to indicate that the processing (which is unspecified in the present discussion but which can correspond to the processing 415 shown generically in FIG. 4a) can be the same in either path of FIG. 10.

At a step 1025 the RN 700 checks once again if the line is still unique (for example, by using another RPU transaction as discussed above). If the outcome is yes then control passes to a step 1030 at which the RN 700 initiates the exclusive sequence locally using its own unique copy. If the outcome is no then control passes to the step 1020 described above.

In these examples, therefore, a requesting node 700 of the set of data handling nodes is configured to communicate a request to the home node for exclusive access to a given instance of data at a given memory address (which may be held by that RN 700 for example); and the home node 710 is configured, in response to the request, to communicate information to other data handling nodes of the set of data handling nodes to control handling, by those other data handling nodes, of any further instances of the data at the given memory address which are held by those other data handling nodes. When one of the other data handling nodes is detected to be currently conducting an exclusive access operation in respect of the given memory address, that one of the other data handling nodes is configured to retain an instance of the data at the given memory address and to indicate to the home node that the given memory address has a status of shared between that one of the other data handling nodes and the requesting node. When one of the other data handling nodes is detected not to be currently conducting an exclusive access operation in respect of the given memory address, that one of the other data handling nodes is configured to invalidate an instance of the data at the given memory address held at that one of the other data handling nodes.

In variants of these embodiments, so-called direct memory transfer ("DMT") can be used when the snoop filter determines that there are no cache copies. This will always return the line in a unique state.

So-called direct cache transfer ("DCT") is typically used only when the HN can determine that only a single cache copy exists. Here, a forwarding snoop, requesting a unique copy, is used only when the HN can determine that the snoop needs to be sent to one single cache.

Example 2: Avoiding Live-Lock

In further examples, it is noted that an exclusive access assumes that when a master or an RN is performing an exclusive sequence, in order for the store portion of the sequence to succeed, the master should check that no other master could have performed the store to the relevant line during the overall exclusive load-exclusive store sequence. In some examples, this may be checked by confirming that the line remains allocated within the master at the point that it issues the exclusive store.

However, while this may resolve the case of another master performing a store from the point that the master completes its exclusive load through to the point that it issues the exclusive store, it does not necessarily resolve the situation where another master may perform a store between the point that the exclusive store is issued and the point that it is scheduled or serialised by the HN.

A live-lock situation could occur if a master can have its cache line invalidated by another master (causing the exclusive store to fail) while its exclusive store is in progress, if the transaction can still proceed and invalidate the line in other caches. This could in principle happen to multiple masters leading to none of the attempted exclusive transactions being successful.

To address this issue, a snoop query transaction is proposed, which is a snoop operation that returns the current state of a cache line that does not return data or change the state of the cache line.

One potential purpose for a snoop query is to establish the state of a cache line when the snoop filter itself has some degree of imprecision, for example for any of the reasons discussed above. The snoop query transaction can be used in association with an exclusive access because it enables the HN to determine that an exclusive capable thread still had a copy of the cache line at a point that a transaction associated with an exclusive store is associated at the home node.

Figure 11:
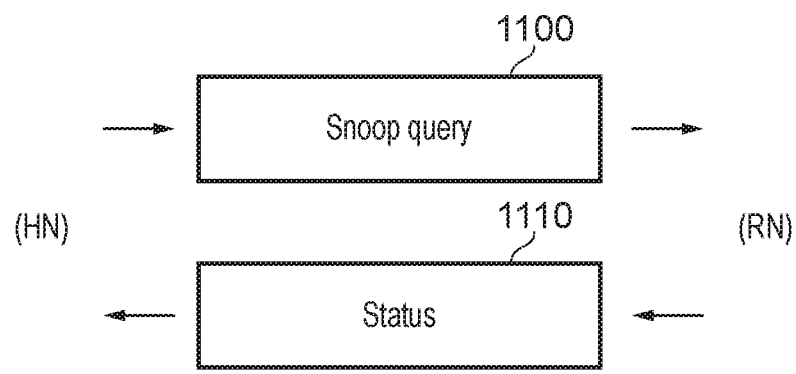
FIG. 11 schematically illustrates a snoop.

FIG. 11 provides a schematic example of snoop query 1100 issued by the HN to the RN, which results in the return 1110 of the status of a cache line specified by the snoop query but with no other change to the status or content of the cache line.

Figure 12:
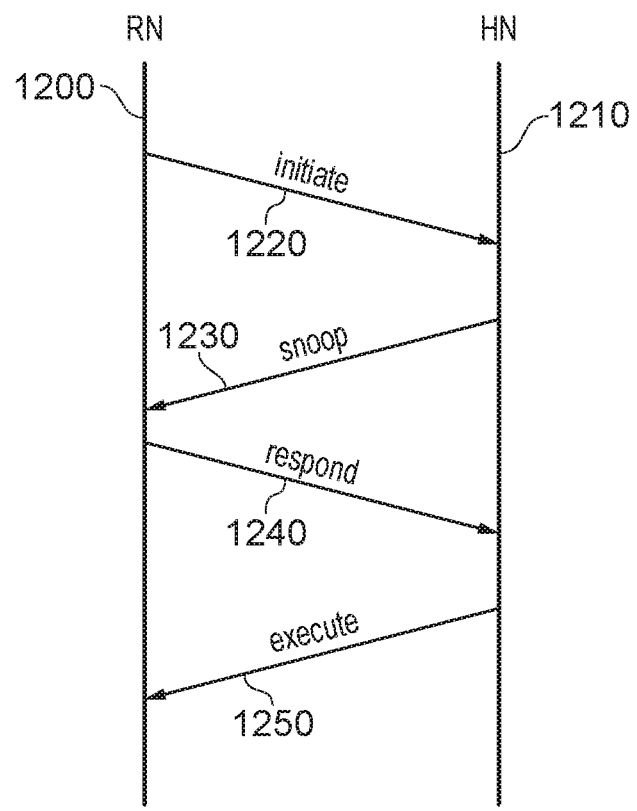
FIG. 12 is a schematic flowchart illustrating a method.

In an example of the use of such a query, references made to a timeline representation of FIG. 12.

An RN 1200 initiates 1220 an exclusive store operation. This requires the HN 1210 to schedule it in amongst other data access operations being overseen by the HN 1210.

As a precursor to scheduling the operation, the HN issues 1230 a snoop query 1100 as described above the originating RN which responds 1240 with the status 1110 of the cache line at the RN, confirming that despite any time gap between initiation of the exclusive operation 1220 and the current time, the line remains allocated at the RN 1200. In response, the HN 1210 initiates execution 1250 of the exclusive operation. In other words the snoop query 230 does not change the state of the line but just checks whether the copy is still held.

In these examples, a requesting node 1200 of the set of data handling nodes is configured to initiate a sequence of operations requiring exclusive access to data at a given memory address, the sequence of operations including an exclusive store operation to the given memory address; and the home node 1210 is configured, prior to executing the exclusive store operation, to detect whether the requesting node currently holds an instance of data at the given memory address by issuing a request to the requesting node, the request being for the requesting node to indicate to the home node whether the requesting node currently holds an instance of data at the given memory address, and to selectively execute the exclusive store operation in response to the detection.

At the step 1250 described above, the home node is configured to execute the exclusive store operation when the home node detects that the requesting node currently holds an instance of data at the given memory address.

Example 3: "Make Read Unique Exclusive"

Figure 13:
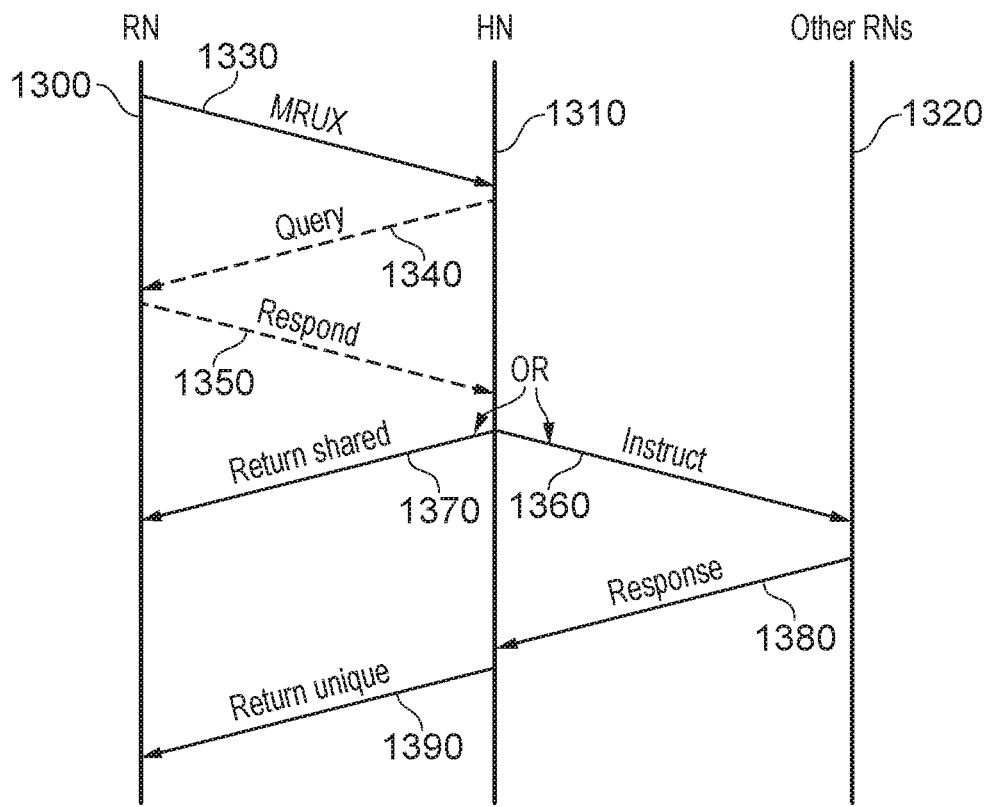
FIG. 13 is a schematic timeline representation.

FIG. 13 is a schematic timeline showing operations as between an RN 1300, an HN 1310 and other RNs 1320 in respect of a so-called make read unique exclusive (MRUX) transaction 1330.

The effect of the MRUX transaction is to invalidate other copies of a line or other data item held at RN 1300. However, in the present example, these actions are performed only if at the time of issuing the invalidation to other RNs, the originating RN 1300 still has its copy of the relevant line.

The HN 1310 can detect whether the RN 1300 had retained its copy of the line by various techniques. One is to use the snoop discussed above with reference to FIG. 11. Another is to use a precise snoop filter at the HN 1310. In FIG. 13 the example is shown in broken line in the use of the snoop 1340 and its response 1350 in order for the HN 1310 to detect that the RN 1300 still has its own copy of the relevant cache line. Assuming that it does, then at a stage 1360 the HN 1310 instructs other RNs 1320 to invalidate their own copies of the cache line. If not, then the HN 1310 returns 1370 a shared copy of the relevant cache line. Note that the step 1370 in FIG. 13 is something of a simplification of the process that would be required for the HN 1310 to obtain and return the shared copy, but it sufficient to illustrate the nature of the operation carried out by the HN 1310.

Note also that the steps 1360 and 1370 are mutually exclusive; one or the other is allowed to happen.

In response to the step 1360, the other RN(s) 1320 provide a response 1380. This allows the HN 1310 to provide a "return unique" indication 1390 to the RN 1300, indicating that the copy held at the RN is now unique.

Figure 14:
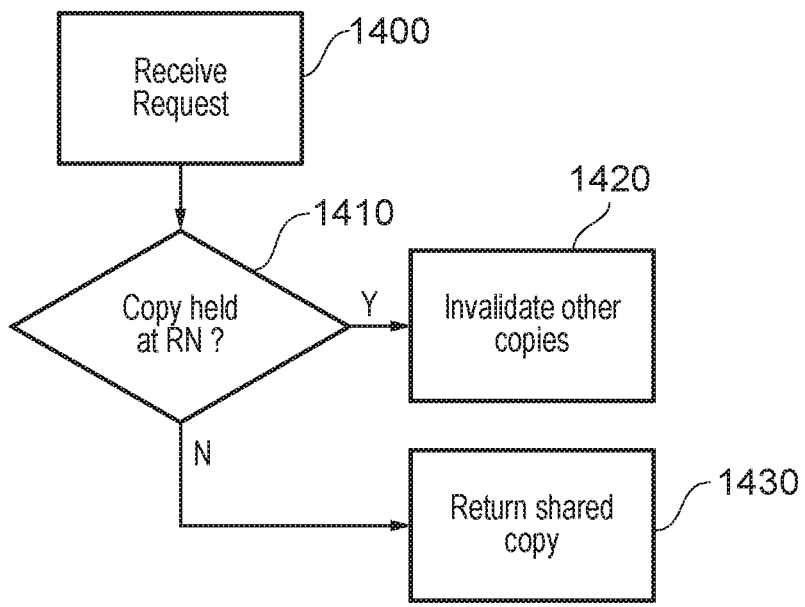
FIGS. 14 to 17 are schematic flowcharts illustrating respective methods.

With reference to a flowchart in FIG. 14, showing operations of the HN 1310, at a step 1400 the HN receives the MRUX transaction 1330. At a step 1410 the HN detects whether a copy is still held at the originating RN 1300, for example by using the snoop and/or by using the contents of a snoop filter directory. If the answer is yes then at a step 1420 the HN 1310 initiates the invalidation of other copies of the cache line, but if the answer is not then at a step 1430 the HN initiates the return to the RN 1300 of a shared copy of the line.

In these examples, a requesting node 1300 of the set of data handling nodes is configured to initiate an exclusivity request transaction in respect of a given memory address; and the home node 1310 is configured, in response to the exclusivity request transaction, to detect whether, at execution of the exclusivity request transaction, the requesting node is storing an instance of data at the given memory address and, when the requesting node is detected to be storing an instance of data at the given memory address, to instruct other data handling nodes 1320 of the set of data handling nodes to invalidate any further instances of the data at the given memory address.

When the requesting node is detected not to be storing an instance of data at the given memory address, the home node is configured not to instruct other data handling nodes of the set of data handling nodes to invalidate any further instances of the data at the given memory address.

As discussed, in examples, a snoop could be used (in which case the home node is configured to detect whether the requesting node currently holds an instance of data at the given memory address by issuing a request to the requesting node, the request being for the requesting node to indicate to the home node whether the requesting node currently holds an instance of data at the given memory address) or a precise snoop filter directory could be used (in which case the home node is configured to maintain snoop data indicating instances of data stored at one or more of the set of data handling nodes, the snoop data is configured to indicate instances of data stored at each of the set of data handling nodes; and the home node is configured to detect whether, at execution of the exclusivity request transaction, the requesting node is storing an instance of data at the given memory address by reference to the snoop data).

Example Methods

Figure 15:
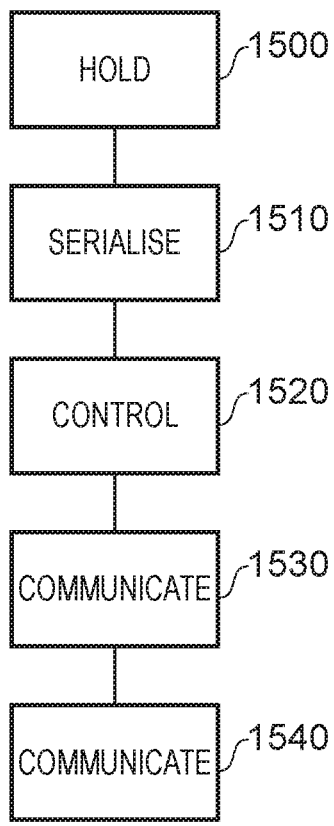

FIG. 15 is a schematic flowchart illustrating a method comprising:

holding (at a step 1500) data, by a set of two or more data handling nodes;

serialising (at a step 1510), by a home node, data access operations;

controlling (at a step 1520), by the home node, coherency amongst data held by the one or more data handling nodes so that data written to a memory address is consistent with data read from that memory address in response to a subsequent access request;

communicating (at a step 1530), by a requesting node of the set of data handling, a request to the home node for exclusive access to a given instance of data at a given memory address; and communicating (at a step 1540), by the home node and in response to the request, information to other data handling nodes of the set of data handling nodes to control handling, by those other data handling nodes, of any further instances of the data at the given memory address which are held by those other data handling nodes.

Figure 16:
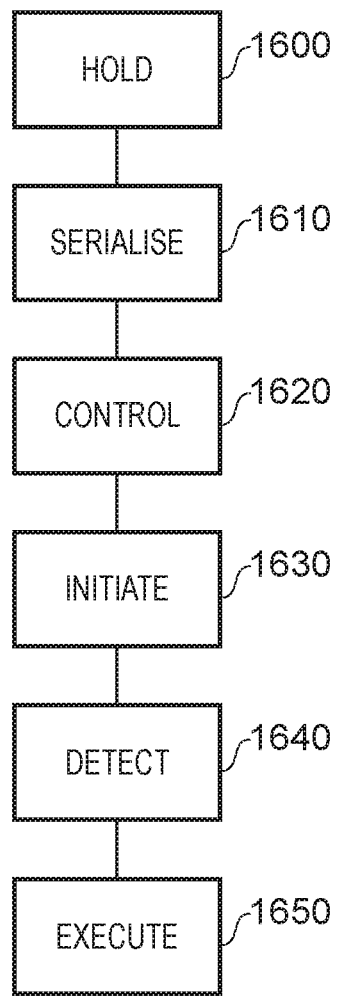

FIG. 16 is a schematic flowchart illustrating a method comprising:

holding (at a step 1600) data, by a set of two or more data handling nodes;

serialising (at a step 1610), by a home node, data access operations;

controlling (at a step 1620), by the home node, coherency amongst data held by the one or more data handling nodes so that data written to a memory address is consistent with data read from that memory address in response to a subsequent access request;

initiating (at a step 1630), by a requesting node of the set of data handling nodes, a sequence of operations requiring exclusive access to data at a given memory address, the sequence of operations including an exclusive store operation to the given memory address;

detecting (at a step 1640), by the home node and prior to executing the exclusive store operation, whether the requesting node currently holds an instance of data at the given memory address, the detecting step comprising issuing a request to the requesting node, the request being for the requesting node to indicate to the home node whether the requesting node currently holds an instance of data at the given memory address; and selectively executing the exclusive store operation in response to the detection.

Figure 17:
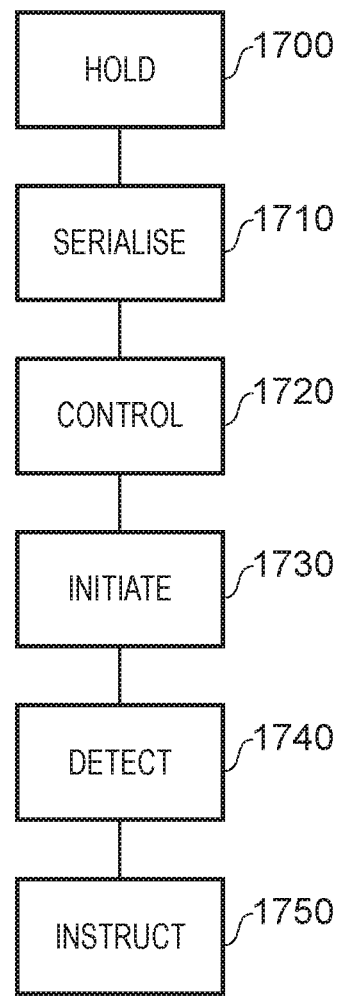

FIG. 17 is a schematic flowchart illustrating a method comprising:

holding (at a step 1700) data, by a set of two or more data handling nodes;

serialising (at a step 1710), by a home node, data access operations;

controlling (at a step 1720), by the home node, coherency amongst data held by the one or more data handling nodes so that data written to a memory address is consistent with data read from that memory address in response to a subsequent access request;

initiating (at a step 1730), by a requesting node of the set of data handling nodes an exclusivity request transaction in respect of a given memory address;

detecting (at a step 1740), by the home node and in response to the exclusivity request transaction, whether, at execution of the exclusivity request transaction, the requesting node is storing an instance of data at the given memory address; and instructing (at a step 1750), by the home node when the requesting node is detected to be storing an instance of data at the given memory address, other data handling nodes of the set of data handling nodes to invalidate any further instances of the data at the given memory address.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Circuitry comprising:
a set of two or more data handling nodes each having respective storage circuitry to hold data; and
a home node to serialize data access operations and to control coherency among data held by the one or more data handling nodes so that data written to a memory address is consistent with data read from that memory address in response to a subsequent access request;
in which:
a requesting node of the set of data handling nodes is configured to communicate a request to the home node for exclusive access to a given instance of data at a given memory address;
the home node is configured, in response to the request, to communicate information to other data handling nodes of the set of data handling nodes to control handling, by those other data handling nodes, of any further instances of the data at the given memory address which are held by those other data handling nodes;
the home node is configured to control detection of whether each of the other data handling nodes is currently conducting an exclusive access operation with respect to the given memory address; and
when one of the other data handling nodes is detected to be currently conducting an exclusive access operation with respect to the given memory address, that one of the other data handling nodes is configured to retain an instance of the data at the given memory address and to indicate to the home node that the given memory address has a status of shared between that one of the other data handling nodes and the requesting node.

2. Circuitry according to claim 1, in which the home node is configured to initiate communication of the data at the given memory address to the requesting node.

3. Circuitry according to claim 1, in which when one of the other data handling nodes is detected not to be currently conducting an exclusive access operation with respect to the given memory address, that one of the other data handling nodes is configured to invalidate an instance of the data at the given memory address held at that one of the other data handling nodes.

4. Circuitry according to claim 1, in which the home node is configured to maintain snoop data indicating instances of data stored at one or more of the set of data handling nodes.

5. Circuitry comprising:
a set of two or more data handling nodes each having respective storage circuitry to hold data; and
a home node to serialize execution of data access operations and to control coherency among data held by the one or more data handling nodes so that data written to a memory address is consistent with data read from that memory address in response to a subsequent access request;
in which:
a requesting node of the set of data handling nodes is configured to initiate a sequence of operations requiring exclusive access to data at a given memory address, the sequence of operations including an exclusive store operation to the given memory address;
the home node is configured, prior to executing the exclusive store operation, to detect whether the requesting node currently holds an instance of data at the given memory address by issuing a request to the requesting node, the request being for the requesting node to indicate to the home node whether the requesting node currently holds an instance of data at the given memory address, and to selectively execute the exclusive store operation in response to the detection; and
the home node is configured to execute the exclusive store operation when the home node detects that the requesting node currently holds an instance of data at the given memory address.

6. Circuitry according to claim 5, in which the home node is configured to maintain control data at least partly indicating which data is currently held by the storage circuitry of the data handling nodes.

7. Circuitry according to claim 5, in which the sequence of operations comprises applying and subsequently releasing an exclusive tag for at least the given memory address.

8. Circuitry comprising:
a set of two or more data handling nodes each having respective storage circuitry to hold data; and
a home node to serialize execution of data access operations and to control coherency among data held by the one or more data handling nodes so that data written to a memory address is consistent with data read from that memory address in response to a subsequent access request;
in which:
a requesting node of the set of data handling nodes is configured to initiate an exclusivity request transaction with respect to a given memory address;
the home node is configured, in response to the exclusivity request transaction, to detect whether, at execution of the exclusivity request transaction, the requesting node is storing an instance of data at the given memory address and, when the requesting node is detected to be storing an instance of data at the given memory address, to instruct other data handling nodes of the set of data handling nodes to invalidate any further instances of the data at the given memory address; and
the home node is configured to detect whether the requesting node currently holds an instance of data at the given memory address by issuing a request to the requesting node, the request being for the requesting node to indicate to the home node whether the requesting node currently holds an instance of data at the given memory address.

9. Circuitry according to claim 8, in which when the requesting node is detected not to be storing an instance of data at the given memory address, the home node is configured not to instruct other data handling nodes of the set of data handling nodes to invalidate any further instances of the data at the given memory address.

10. Circuitry according to claim 8, in which the home node is configured to maintain snoop data indicating instances of data stored at one or more of the set of data handling nodes.

11. Circuitry according to claim 10, in which:
the snoop data is configured to indicate instances of data stored at each of the set of data handling nodes; and
the home node is configured to detect whether, at execution of the exclusivity request transaction, the requesting node is storing an instance of data at the given memory address by reference to the snoop data.

* * * * *